United States Patent [19]

Custro et al.

[11] Patent Number: 5,272,214

[45] Date of Patent: Dec. 21, 1993

[54] RADIAL AND BRANCHED BLOCK COPOLYMERS, COMPOSITIONS WHICH CONTAIN THEM, THEIR PREPARATION AND THEIR USE IN BITUMINOUS COMPOSITIONS

[75] Inventors: Sergio Custro, Ravenna; Elio Diani, Cassina de Pecchi; Alessandro Zazzetta, Cesema, all of Italy

[73] Assignee: Enichem Elastomeri S.p.A., Palermo, Italy

[21] Appl. No.: 663,793

[22] Filed: Mar. 4, 1991

Related U.S. Application Data

[63] Continuation of Ser. No. 395,306, Aug. 17, 1989, abandoned, which is a continuation of Ser. No. 121,456, Nov. 17, 1987, abandoned.

[30] Foreign Application Priority Data

Dec. 1, 1986 [IT]  Italy ................. 22519 A/86

[51] Int. Cl.$^5$ .................... C08F 297/04; C08L 53/02
[52] U.S. Cl. ................... 525/314; 525/271; 524/59; 524/68
[58] Field of Search ............... 525/314, 271; 524/59, 524/68

[56] References Cited

U.S. PATENT DOCUMENTS

| | | | |
|---|---|---|---|
| 3,723,575 | 3/1973 | Kern et al. ............... | 525/271 |
| 3,953,543 | 4/1976 | Futamura et al. ............... | 525/271 |
| 4,163,764 | 8/1979 | Nash . | |
| 4,418,180 | 11/1983 | Heinz et al. ............... | 525/314 |
| 4,430,465 | 2/1984 | Abbott ............... | 524/59 |
| 4,433,084 | 2/1984 | Ostermeyer et al. ............... | 524/59 |
| 4,485,210 | 11/1984 | Neiditch et al. ............... | 525/53 |
| 4,738,996 | 4/1988 | Vonk et al. ............... | 524/59 |
| 4,824,880 | 4/1989 | Algrim et al. ............... | 524/59 |
| 5,019,610 | 5/1991 | Sitz et al. ............... | 524/59 |
| 5,023,282 | 6/1991 | Neubert ............... | 524/59 |

FOREIGN PATENT DOCUMENTS

| | | |
|---|---|---|
| 853210 | 8/1977 | Belgium . |
| 0045816 | 2/1982 | European Pat. Off. . |
| 0046862 | 3/1982 | European Pat. Off. . |
| 0171225 | 2/1986 | European Pat. Off. . |
| 2010289 | 6/1979 | United Kingdom . |

OTHER PUBLICATIONS

Morrison, R. T. and Boyd, R. N. "Organic Chemistry", Fifth ed., Allyn and Bacon, Inc., 1987, p. 532.

D. C. Allport and W. H. Janes, Blcock Copolymers, Applied Science Publishers Ltd., Feb. 1981, pp. 76-79 and 98-99.

*Primary Examiner*—James J. Seidleck
*Assistant Examiner*—Vasu S. Jagannathan
*Attorney, Agent, or Firm*—Shea & Gould

[57] ABSTRACT

Radial and branched block copolymers show a structure:

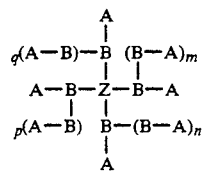

wherein:

Z is a radical deriving from a tetrafunctional coupling agent;

A is a polystyrene block;

B is a polybutadiene block m, n, p, q are either 1 or zero, with the condition that their sum is comprised within the range of from 1 to 4.

Compositions of block copolymers comprise the hereinabove disclosed radial and branched block copolymers, blended with a two-block copolymer B-A, and an "A" homopolymer.

The process for the preparation of said radial and branched block copolymers and of the related compositions is disclosed, and furthermore their use is disclosed in bituminous compositions, in order to improve the general characteristics of the bitumens.

16 Claims, No Drawings

RADIAL AND BRANCHED BLOCK COPOLYMERS, COMPOSITIONS WHICH CONTAIN THEM, THEIR PREPARATION AND THEIR USE IN BITUMINOUS COMPOSITIONS

This application is a continuation of application Ser. No. 07/395,306, filed Aug. 17, 1989, now abandoned, which, in turn, is a continuation of application Ser. No. 07/121,456, filed Nov. 17, 1987, now abandoned.

The present invention relates to radial and branched block copolymers, to the polymeric compositions which contain them, to the process for preparing them, and to their use in bituminous compositions.

In the art, polymerizing by anionic way suitable monomers in the presence of metal-alkyl or metal-aryl catalysts is known, with "living" polymers being obtained, which are then suitable to undergo further transformations, as described, e.g., by M. Shwarc, "Carbanions, Living Polymers and El. Transfer Processes", Interscience Publishers, J. Wiley & Sons, New York, 1968.

By the technique of the "living" polymers, it is possible to prepare linear or radial block copolymers. Among the linear block copolymers, e.g., polymers of A-B-A type can be obtained, wherein "A" is a polystyrene block endowed with non-elastomeric thermoplastic properties, and "B" is an elastomeric polybutadiene block.

The radial block copolymers can be obtained by means of the reaction of the living polymer with a suitable coupling agent.

In case, e.g., silicon tetrachloride is used, polymers are obtained, which can be represented by the formula Si (B-A)$_4$ wherein B and A can have the above specified meaning.

In the art, the use is also known of such both linear and radial block copolymers, in bituminous compositions, for the purpose of improving the general characteristics of bitumens, in particular their properties of elasticity, adhesion and anti-creeping behaviour.

For example, in BE-738,281 patent, bituminous compositions are disclosed, which contain approximately 15% by weight of a linear block copolymer A-B-A, wherein "A" is a thermoplastic block (in general a polystyrene block), and "B" is an elastomeric block, generally a polybutadiene block.

The use of radial block copolymers of polystyrene-polybutadiene type in bituminous compositions is disclosed, e.g., in BE-853,210 patent.

Finally, U.S. Pat. No. 4,464,427 discloses bituminous compositions containing both a linear block copolymer and a radial block copolymer, belonging to the above mentioned types.

It was observed that the block copolymers of radial type give the bituminous compositions into which they are incorporated, characteristics of adhesion, elasticity, anticreeping, which are generally better than obtainable with the use of linear block copolymers.

The larger the number of polymeric segments in the radial copolymer, the more meaningful such improvement.

Therefore, it would be desirable to have available block copolymers of radial type with a large number of polymeric segments linked to the polyfunctional coupling agent.

But, as a practical matter of fact, such a realization is limited by the difficulties and/or high costs to be faced when radial block copolymers are prepared, which contain more than four segments connected to said coupling agent.

The present Applicant found now that it is possible to exceed the present state of the art, and prepare block copolymers of radial type, containing four polymeric segments linked to the tetrafunctional coupling agent, characterized in that said polymeric segments show a controlled branching degree.

The radial and branched block copolymers of the present invention are capable of giving the bituminous compositions into which they are incorporated, mechanical-technological characteristics which are unexpectedly improved as compared to the corresponding radial block copolymers not containing such branchings.

Another purpose of the present invention is constituted by polymeric compositions which contain said radial and branched block copolymers.

A further purpose of the present invention is constituted by the process for the preparation of said radial and branched block copolymers and of the polymeric compositions which contain said radial and branched copolymers.

Still a further purpose of the present invention is constituted by the bituminous compositions containing said radial and branched block copolymers, or said polymeric compositions.

Other purposes of the invention will become evident from the following disclosure.

In particular, according to the present invention, the radial and branched block copolymers show a structure:

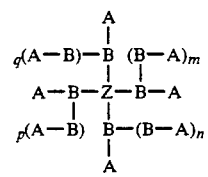

wherein:

Z is a radical deriving from a tetrafunctional coupling agent;

A is a polystyrene block;

B is a polybutadiene block m, n, p, q are either 1 or zero, with the condition that their sum is comprised within the range of from 1 to 4.

The polystyrene block "A" shows in general a molecular weight comprised within the range of from 10,000 to 40,000, and preferably comprised within the range of from 15,000 to 25,000.

The polybutadiene block "B" shows in general a molecular weight comprised within the range of from 20,000 to 70,000, and preferably comprised within the range of from 40,000 to 50,000.

The sum of m, n, p, q is preferably comprised within the range of from 1 to 3.

The polymeric compositions according to the present invention contain at least 50% by weight, and preferably at least 60% by weight, of the above disclosed radial and branched block copolymers, the balance being constituted by two-block copolymers B-A, and by "A" homopolymer, wherein "A" and "B" have the above explained meanings.

The process for preparing such polymeric compositions comprises the following steps, carried out sequentially:

a) polymerization of styrene monomer, by means of the technique of the living polymers, and by operating at a temperature of from approximately 35° C. to approximately 65° C., using catalysts constituted by metal-alkyl or metal-aryl compounds, to yield a polystyrene block, having a molecular weight of from 10,000 to 40,000, containing a metal atom linked to the end of the polymeric chain: A-M (wherein "M" is the metal of the metal-alkyl or metal-aryl catalyst and "A" is the polystyrene block).

b) polymerization of 1,3-butadiene monomer by the technique of the living polymers, in the presence of the polystyrene block wherein the metal atom is linked to the end of the polymeric chain coming from previous (a) step, by operating at a temperature of from approximately 60° C. to 100° C., yield a two-block copolymer, wherein the metal atom is linked to the end of the polystyrene chain: A-B-M, wherein "A" is the polystyrene block, "B" is the polybutadiene block having a molecular weight of from 20,000 to 70,000, and "M" has the above disclosed meaning.

c) heating of the reaction mixture obtained in the (b) step, at a temperature comprised within the range of more than 100° C. up to approximately 140° C., generally comprised within the range of from 110° C. to 125° C., for a long enough time to cause a grafting of the two-block copolymer B-A, and to obtain grafted and metal-containing structures which can be represented by the formula:

wherein A, B, M have the above disclosed meaning.

d) coupling of the metal-containing structures coming from the (c) step, by means of a tetrafunctional coupling agent;

e) recovery of the polymeric species from the mixture deriving from the coupling reaction of the (d) step, and, optionally, f) separation of the radial and branched block copolymers of the polymeric species recovered in the (e) step.

According to a preferred form of practical embodiment of the present invention, the styrene polymerization (the (a) step) and the subsequent copolymerization with butadiene (the (b) step) are carried out adiabatically, so that at the end of the (b) step a temperature is obtained, which is higher than 100° C., up to a maximum of 140° C. The fact that the temperature, at the end of the copolymerization with butadiene, is higher than 100° C., is essential in order to obtain radial and branched block copolymers according to the present invention.

In fact, if the end temperature of the copolymerization with butadiene is lower than 100° C., and a heating to increase such temperature to the previously mentioned values is not carried out, the reaction of grafting of the B-A copolymer on the polybutadiene B blocks does not take place, and the end products, after the coupling, are not-branched radial copolymers.

In practice, the styrene polymerization (the (a) step) is carried out under anhydrous conditions, as it is required for the obtainment of living polymers, in solution in inert hydrocarbon solvents, such as, e.g., cyclohexane and n-hexane, at an initial temperature of about 50° C., using as the catalyst an alkyl-metal or an aryl-metal compound, in particular, n-butyl-lithium or sec-butyl-lithium, in a styrene/catalyst molar ratio comprised within the range of from 1,000 to 5,000, and, preferably, comprised within the range of from 1,500 to 2,500.

The reaction is left proceed for approximately 60 minutes, until the complete, or substantially complete, conversion of styrene is achieved, and polymeric blocks of a molecular weight comprised within the range of from 10,000 to 40,000, and, preferably, comprised within the range of from 15,000 to 25,000, are obtained.

To the solution containing the polystyrene blocks containing the metal atom at an end of their polymeric chain, such solution being at a temperature of approximately 60°-65° C., 1,3-butadiene is added, and, within a time of approximately 40 minutes, linear polymers B-A are obtained, in which the "B" block has a molecular weight comprised within the range of from 20,000 to 70,000, and, preferably, comprised within the range of from 40,000 to 50,000.

The solution deriving from the copolymerization with butadiene is left stay at a temperature higher than 100° C., and preferably comprised within the range of from 110° C. to 125° C. for a time of from 10 to 20 minutes.

After this time period, to the mixture a tetrafunctional coupling agent is added, which can be selected from the esters of aliphatic and aromatic bicarboxylic acids; the chloroderivatives of aliphatic or aromatic hydrocarbons; the chloroderivatives of aliphatic or aromatic silanes; the substituted unsaturated arenes, such as, e.g., divinylbenzene; tetrachloroderivatives of tin, silicon, germanium, and, preferably, $SiCl_4$, in a molar ratio of $SiCl_4$/styrene equivalent to the stoichiometric, or approximately stoichiometric, ratio.

The coupling reaction is carried out at a temperature comprised within the range of from 100° C. to 140° C., and, preferably, comprised within the range of from 110° C. to 125° C., for a time of from 5 to 15 minutes, and the yield generally reaches a value of approximately 90%.

To the polymeric species contained in the solution an amount of from 1 to 1.5% by weight of an antioxidant is added, and said polymeric species are recovered from the reaction mixture by solvent stripping, and drying in a vacuum oven at 60° C.

The so-obtained polymeric composition can be added as such to the bituminous compositions, or, as an alternative, the radial and branched copolymers can be separated from the other polymeric species.

The polymeric composition deriving from the (e) step comprises at least 50% by weight, and, preferably, at least 60% by weight, of the radial and branched copolymers, the balance to 100% being constituted by the styrene-butadiene linear copolymer, and by polystyrene.

The radial and branched block copolymers of the instant invention are capable of supplying a considerable improvement in the mechanical and technological properties of the bituminous compositions into which they are incorporated, relatively to the corresponding not-branched, radial polymers.

It is furthermore possible to obtain bituminous compositions which are endowed with the same characteristics as of the prior art, by using said copolymers in amounts which are smaller than known from the prior art.

Such radial and branched block copolymers of the present invention can be used in amounts comprised within the range of from 2 to 30 parts by weight per each 100 parts of bitumen, and, preferably, comprised within the range of from 8 to 13 parts by weight per each 100 parts of bitumen.

The following Examples are to be considered as being illustrative and not limitative of the purview of the invention.

EXAMPLE 1

To a reactor of 1 liter of capacity, from which moisture is removed by means of warm nitrogen, equipped with stirrer, thermometer and cooling chamber, 400 ml of anhydrous cyclohexane and 15 g (0.144 mol) of styrene distilled over calcium hydride are charged. Cyclohexane contains 0.035 g of THF.

The mixture is stirred at 50° C. and is kept stirred.

0.047 g (0.73 mmol) of sec-butyl-lithium is added as the polymerization initiator, and the reaction is allowed to proceed for 60 minutes, with the temperature being maintained at 50° C., until styrene conversion is complete.

At the end of this time period, 35 g (0.648 mmol) of 1,3-butadiene is added, and the polymerization is allowed to proceed for 40 minutes.

The end temperature of the polymerization is of 95° C. The block copolymer, a living copolymer, which is formed, is left for one minute at 100° C., and to the reactor 0.028 g (0.165 mmol) of $SiCl_4$ is subsequently added.

The reaction is allowed to proceed for 15 minutes at 97° C., and, at the end of this time period, the obtained polymeric mass is discharged from the reactor into a glass flask containing 45 g of BHT and Polygard.

The polymeric solution is then stripped in steam stream, and is dried in a vacuum oven at 60° C. for 2 hours.

The polymeric composition was characterized by get permeation chromatography, and the results are shown in Table I.

TABLE I

| | |
|---|---|
| Mw (AB): | $70.10^3$ |
| Mw (AB)$_n$: | $260.10^3$ |
| Mw/Mn (AB): | 1.03 |
| Mw/Mn (AB)$_n$: | 1.02 |

The polymeric composition was used for the preparation of a bituminous composition, by blending 13 parts of the polymeric composition with 100 parts of bitumen (SOLEA 180/200).

The characteristics of the bituminous composition are reported in Table II, in accordance with ASTM D5-65 and ASTM D36-66T Standards.

TABLE II

| | |
|---|---|
| Viscosity (at 180° C.) = | 2,100 cps |
| Ring Ball = | 125-130° C. |
| Penetration = | 40-45 dmm |

EXAMPLE 2

The same amounts of reactants of Example 1 are used, but the reactions are carried out under adiabatic conditions: the initial temperature of styrene polymerization is of 60° C., and, within a time of 20 minutes, the reaction temperature rises up to reach 65° C., when monomer conversion is complete.

At the end of the copolymerization with 1,3-butadiene, the temperature, due to the effect of the exothermic heat released by the reaction, reaches the value of 120° C.

The polymeric solution, at the end of the reaction with butadiene, is left for 15 minutes at 120° C., then the process is continued by adding silicon tetrachloride, as disclosed in Example 1.

The characteristics of the polymeric composition are reported in Table III.

The end polymeric composition is used for preparing a bituminous composition, by mixing 10 parts of the polymeric composition with 100 parts of bitumen (SOLEA 180/200).

The characteristics of the so obtained bituminous composition are reported in Table IV, in accordance with ASTM D5-65 and ASTM D36-66T Standards.

TABLE III

| | |
|---|---|
| Mw (AB): | $100.10^3$ |
| Mw (AB)$_n$: | $330.10^3$ |
| Mw/Mn (AB): | 1.4 |
| Mw/Mn (AB)$_n$: | 1.4 |

TABLE IV

| | |
|---|---|
| Viscosity (at 180° C.) = | 1,700 cps |
| Ring Ball = | 127° C. |
| Penetration = | 56 dmm |

We claim:

1. Radial and branched block copolymers having the formula:

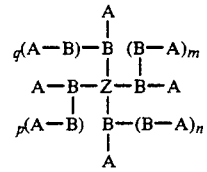

wherein:

Z is a radical derived from a tetrafunctional coupling agent;

A is a polystyrene block having a weight average molecular weight within the range of from 15,000 to 40,000;

B is a polybutadiene block having a weight average molecular weight within the range of from 20,000 to 70,000;

m, n, p, q are either 1 or zero, with the condition that their sum is within the range of from 1 to 4, said copolymers produced by the process comprising:

a) polymerizing styrene monomer at a temperature of from 35° C. to 65° C., in the presence of a catalyst selected from metal-alkyl or metal-aryl compounds, to yield a polystyrene block having a weight average molecular weight of from 10,000 to 40,000 containing a metal atom linked to the end of a polymeric chain having the formula A-M, wherein M represents the metal of the metal-alkyl or metal-aryl catalyst, and A is the polystyrene block;

(b) polymerizing 1,3-butadiene monomer in the presence of the polystyrene block wherein the metal atom is linked to the end of the polymeric chain, to yield a two-block copolymer wherein the metal atom is linked to the end of the polybutadiene chain having the formula A-B-M, wherein A is the polystyrene block, B is the polybutadiene block having a weight average molecular weight of from 20,000 to 70,000, and M is as defined above;

(c) heating the reaction mixture obtained in the (b) step, at a temperature of from 110° to 125° C., for 10 to 20 minutes to thereby cause grafting of the two-block copolymer B-A, and to obtain grafted and metal-containing structures having the formula:

$$\begin{array}{c} A-B \\ | \\ A-B-M \end{array}$$

wherein A, B and M have the above disclosed meaning;

(d) coupling the metal-containing structures produced in step (c) with a tetrafunctional coupling agent; and (e) recovering the resulting polymeric species from step (d).

2. The copolymers according to claim 1, wherein the sum of m, n, p, and q is within the range of from 1 to 3.

3. The copolymers according to claim 1, wherein the polystyrene block has a weight average molecular weight within the range of from 15,000 to 25,000, and the polybutadiene block has a weight average molecular weight within the range of from 40,000 to 50,000.

4. The copolymers according to claim 1, wherein the radical Z is silicon.

5. The copolymers according to claim 1, wherein the process of producing said copolymers further comprises separating the radial and branched block copolymers from the polymeric species recovered in step (e).

6. The copolymers according to claim 1, wherein the polystyrene block produced in step (a) has a weight average molecular weight of from 15,000 to 25,000.

7. The copolymers according to claim 1, wherein the two-block copolymer obtained in step (b) has the formula B-A and the homopolymer A has a weight average molecular weight of from 15,000 to 25,000, and the polybutadiene block B has a weight average molecular weight of from 40,000 to 50,000.

8. The copolymers according to claim 1, wherein the tetrafunctional coupling agent is selected from the group consisting of the esters of aliphatic and aromatic dicarboxylic acids, chlorine substituted aliphatic hydrocarbons, substituted unsaturated arenes, and tetrachlorosubstituted compounds of tin, silicon and germanium.

9. The copolymers according to claim 8, wherein the tetrafunctional coupling agent is $SiCl_4$.

10. A polymer composition comprising:

(1) at least 50% by weight of radial or branched block copolymers having the formula

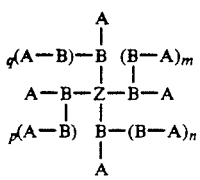

wherein:

Z is a radical derived from a tetrafunctional coupling agent;

A is a polystyrene block having a weight average molecular weight within the range of from 15,000 to 40,000;

B is a polybutadiene block having a weight average molecular weight within the range of from 20,000 to 70,000;

m, n, p, q are either 1 or zero, with the condition that their sum is within the range of from 1 to 4; said copolymer being produced by the process comprising:

a) polymerizing styrene monomer at a temperature of from 35° C. to 65° C., in the presence of a catalyst selected from metal-alkyl or metal-aryl compounds, to yield a polystyrene block having a weight average molecular weight of from 10,000 to 40,000 containing a metal atom linked to the end of a polymeric chain having the formula A-M, wherein M represents the metal of the metal-alkyl or metal-aryl catalyst, and A is the polystyrene block;

b) polymerizing 1,3-butadiene monomer in the presence of the polystyrene block wherein the metal atom is linked to the end of the polymeric chain, to yield a two-block copolymer wherein the metal atom is linked to the end of the polybutadiene chain having the formula A-B-M, wherein A is the polystyrene block, B is the polybutadiene block having a weight average molecular weight of from 20,000 to 70,000, and M is as defined above;

(c) heating the reaction mixture obtained in the (b) step, at a temperature of from 110° to 125° C., for 10 to 20 minutes to thereby cause grafting of the two-block copolymer B-A, and to obtain grafted and metal-containing structures having the formula:

$$\begin{array}{c} A-B \\ | \\ A-B-M \end{array}$$

wherein A, B and M have the above disclosed meaning;

(d) coupling the metal-containing structures produced in step (c) with a tetrafunctional coupling agent; and (e) recovering the resulting polymeric species from step (d); and (2) the balance comprising a linear two-block copolymer having the formula B-A and a homopolymer having the formula A.

11. The polymer composition according to claim 10, wherein the sum of m, n, p, and q is within the range of from 1 to 3.

12. The polymer composition according to claim 10, wherein the polystyrene block has a molecular weight within the range of from 15,000 to 25,000, and the polybutadiene block has a weight average molecular weight within the range of from 40,000 to 50,000.

13. The polymer composition according to claim 10, wherein the radical Z is silicon.

14. The polymer composition according to claim 10, wherein the radial and branched block copolymers are present in an amount of at least 60% by weight.

15. A bitumen-containing composition comprising:

(a) 2 to 30 parts by weight of a radial or branched block copolymer having the formula:

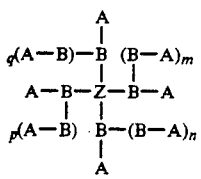

wherein:

Z is a radical derived from a tetrafunctional coupling agent;

A is a polystyrene block having a weight average molecular weight within the range of from 15,000 to 40,000;

B is a polybutadiene block having a weight average molecular weight within the range of from 20,000 to 70,000;

m, n, p, q are either 1 or zero; with the condition that their sum is within the range of from 1 to 4; said copolymer produced by the process comprising:

(1) polymerizing styrene monomer at a temperature of from 35° C. to 65° C., in the presence of a catalyst selected from metal-alkyl or metal-aryl compounds, to yield a polystyrene block having a weight average molecular weight of from 10,000 to 40,000 containing a metal atom linked to the end of a polymeric chain having the formula A-M, wherein M represents the metal of the metal-alkyl or metal-aryl catalyst, and A is the polystyrene block;

(2) polymerizing 1,3-butadiene monomer in the presence of the polystyrene block wherein the metal atom is linked to the end of the polymeric chain, to yield a two-block copolymer wherein the metal atom is linked to the end of the polybutadiene chain having the formula A-B-M, wherein A is the polystyrene block, B is the polybutadiene block having a weight average molecular weight of from 20,000 to 70,000, and M is as defined above;

(3) heating the reaction mixture obtained in the (2) step, at a temperature of from 110° to 125° C., for 10 to 20 minutes to thereby cause grafting of the two-block copolymer B-A, and to obtain grafted and metal-containing structures having the formula:

wherein A, B and M have the above disclosed meaning;

(4) coupling the metal-containing structures produced in step (3) with a tetrafunctional coupling agent; and (5) recovering the resulting polymeric species from step (4); and (b) 100 parts by weight of bitumen.

16. The composition of claim 15 wherein the amount of said copolymer is 8 to 13 parts by weight.

* * * * *